Feb. 7, 1939.                C. HAIL                 2,146,211
                  GASOLINE HOSE NOZZLE ATTACHMENT
                      Filed April 11, 1938
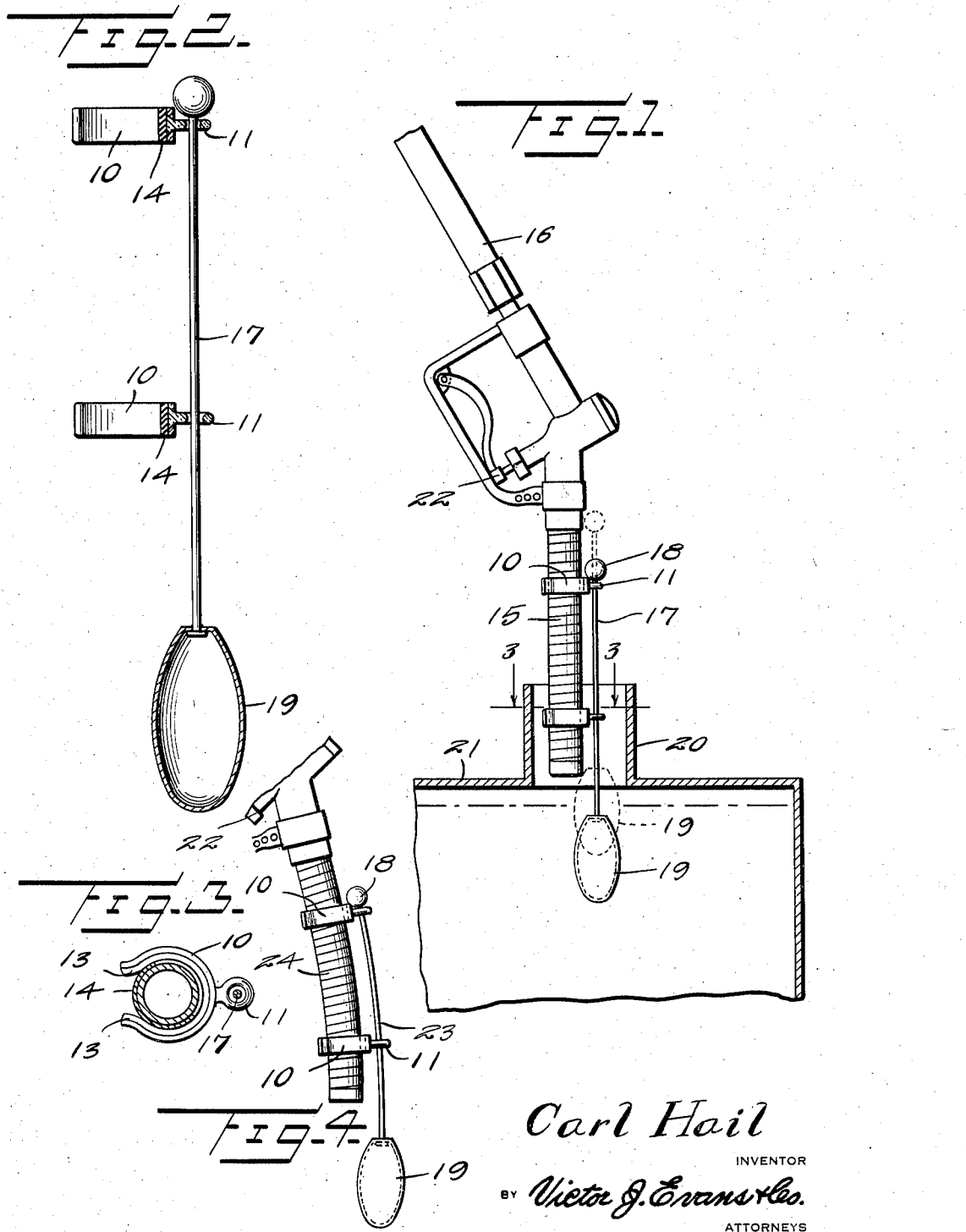
Carl Hail
INVENTOR
BY Victor J. Evans & Co.
ATTORNEYS Patented Feb. 7, 1939

2,146,211

UNITED STATES PATENT OFFICE 2,146,211

GASOLINE HOSE NOZZLE ATTACHMENT

Carl Hail, Albany, Tex.

Application April 11, 1938, Serial No. 201,427

2 Claims. (Cl. 73—294)

This invention relates to gasoline hose nozzle attachments and has for an object to provide a float operated indicator attachment adapted to be applied to the nozzle of any gasoline hose without any changes in the construction of the nozzle and adapted to indicate the level of gasoline in an automobile or other vehicle tank so that overflow waste in filling the tank will be positively eliminated.

A further object is to provide an indicator of this type which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a side elevation showing a conventional gasoline hose and motor vehicle tank, the hose being equipped with a liquid level indicator constructed in accordance with the invention.

Figure 2 is a longitudinal sectional view of the indicator with parts in elevation.

Figure 3 is a cross sectional view of the indicator and nozzle taken on the line 3—3 of Figure 1.

Figure 4 is a side elevation of a modified form of the indicator in which the same is applied to a slightly curved nozzle.

Referring now to the drawing in which like characters of reference designate similar parts in the various views, 10 designates a pair of split ring spring clamps each having a guide eye 11 projecting from its outer side diametrically opposite the open end 13 of the clamp, as best shown in Figure 3. The clamp may be faced with rubber as shown at 14 to secure a firm grip on the conventional nozzle 15 of the conventional hose 16 of a gasoline pump, not shown.

A float stem 17 is slidably fitted in the clamps 10 which latter are arranged in spaced relation on the nozzle with their eyes 11 in alignment. An indicator knob 18 is secured to the upper end of the stem and normally is supported upon the eye 11 of the upper clamp 10. A float 19 is secured to the lower end of the stem and is of substantially elliptical formation in longitudinal cross section so as to permit its passage readily through the filling tube 20 of a conventional gasoline tank 21.

In operation the indicator knob 18 is in full view of the station attendant at all times and is moved upwardly by the float when the tank is full, from the position shown in full lines in Figure 1 to the position shown in dotted lines, thus furnishing a visible warning that the nozzle valve 22 must be shut off to prevent waste by overflow.

A modified form of the invention is shown in Figure 3 in which the parts are the same as above described and have been given identical numerals with the exception that the float stem 23 is slightly curved longitudinally to conform to the curvature of a slightly curved nozzle 24.

From the above description it is thought that the construction and operation of the invention will be fully understood without further explanation.

What is claimed is:

1. An indicator attachment for gasoline hose nozzles comprising a pair of spring clamps adapted to embrace the nozzle, aligned eyes on the clamps, a wire forming a float stem slidably engaged in said eyes, a float on the bottom of the stem, and an indicator knob on the top of the stem engageable with the uppermost eye limiting downward movement of the float to a point adjacent to and below the outlet end of the nozzle, said knob being adapted to be in full view of an operator and adapted to be moved upwardly by the float when a tank in which the nozzle is inserted, is full.

2. An indicator attachment for gasoline hose nozzles comprising a pair of split ring spring clamps, eyes on the opposite sides of the clamps from the open sides of the clamps, a float stem slidably engaged in said eyes, said eyes adapted to be disposed in superposed position when the hose nozzle is inserted in a tank to be filled, a float on one end of the stem, and a knob on the other end of the stem engageable with the uppermost of said superposed eyes to dispose the float at its downward limit of movement adjacent to and below the discharge end of the nozzle, said knob being within full view of an operator and adapted to be moved upwardly by the float when the tank is full.

CARL HAIL.